(12) United States Patent
Becker

(10) Patent No.: US 8,195,015 B2
(45) Date of Patent: Jun. 5, 2012

(54) METHOD AND DEVICE FOR DYNAMIC MEASUREMENT OF THE RADIAL DEFORMATION OF A ROLLING BEARING RING

(75) Inventor: Edwin Becker, Reken (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 259 days.

(21) Appl. No.: 12/634,079

(22) Filed: Dec. 9, 2009

(65) Prior Publication Data

US 2010/0158434 A1   Jun. 24, 2010

(30) Foreign Application Priority Data

Dec. 11, 2008 (DE) .................. 10 2008 061 553

(51) Int. Cl.
*G02B 6/00* (2006.01)
*G01B 11/16* (2006.01)

(52) U.S. Cl. ............... 385/13; 385/12; 385/25; 385/26; 356/32; 356/33; 356/34; 356/35.5; 356/493; 356/494; 356/495; 356/138

(58) Field of Classification Search .......... 385/12–13, 385/25–26; 356/32–35.5, 493–495, 138
See application file for complete search history.

(56) References Cited

U.S. PATENT DOCUMENTS

| | | | |
|---|---|---|---|
| 4,196,629 A * | 4/1980 | Philips | 73/593 |
| 4,761,073 A | 8/1988 | Meltz et al. | |
| 4,806,012 A | 2/1989 | Meltz et al. | |
| 4,814,603 A * | 3/1989 | Philips | 250/227.21 |
| 4,870,271 A * | 9/1989 | Philips | 250/231.1 |
| 4,914,291 A * | 4/1990 | Kan et al. | 250/231.12 |
| 5,426,297 A | 6/1995 | Dunphy et al. | |
| 5,644,951 A * | 7/1997 | Hatamura | 74/89.42 |
| 6,448,551 B1 | 9/2002 | Kersey | |
| 6,920,801 B2 | 7/2005 | Van Leeuwen et al. | |
| 7,086,834 B2 * | 8/2006 | LeMieux | 416/1 |
| 7,762,128 B2 * | 7/2010 | Ozaki et al. | 73/117.01 |
| 2008/0158562 A1 * | 7/2008 | Becker | 356/426 |
| 2009/0114004 A1 * | 5/2009 | Ozaki et al. | 73/117.01 |

FOREIGN PATENT DOCUMENTS

| | | |
|---|---|---|
| EP | 1 939 598 A1 | 7/2008 |
| GB | 2 113 845 A | 8/1983 |
| JP | 2009216664 A * | 9/2009 |
| JP | 2009216665 A * | 9/2009 |
| WO | 2005/111537 A1 | 11/2005 |

* cited by examiner

*Primary Examiner* — Brian M. Healy
*Assistant Examiner* — Guy Anderson
(74) *Attorney, Agent, or Firm* — Roberts Mlotkowski Safran & Cole, P.C.; David S. Safran

(57) ABSTRACT

A method and a device for dynamic measurement of the radial deformation of a bearing ring (12) of a rolling bearing (10) for a rotating element (16), a glass fiber segment (22) of a fiber optic sensor (24) that is fixed in or to the periphery of the bearing ring, a light signal which has been generated by the light source (30) being injected into the glass fiber segment, and the light signal passing through the glass fiber segment being detected by a detector (34), the longitudinal deformation of the glass fiber segment being determined from the change of at least one parameter of the light signal, when the light signal passes through the glass fiber segment, in order to determine the corresponding radial deformation of the bearing ring.

19 Claims, 2 Drawing Sheets

METHOD AND DEVICE FOR DYNAMIC MEASUREMENT OF THE RADIAL DEFORMATION OF A ROLLING BEARING RING

BACKGROUND OF THE INVENTION

1. Field of the Invention

This invention relates to a method and a device for dynamic measurement of the radial deformation of a rolling bearing ring.

2. Description of Related Art

For diagnosis of the state of rolling bearing rings and for detecting load states and stresses of the rolling bearing, it is helpful to dynamically detect the deformation of the rolling bearing.

UK Patent Application GB 2 113 845 A discloses a rolling bearing in which there are force sensors (which can be fiber optic sensors) on the outer peripheral surface and on the face sides of the stationary outer ring. Here, both radially acting and also axially acting forces are detected, the corresponding expansion of the sensor being detected as a function of time. The force sensors are provided at a few special positions distributed in the peripheral direction. Thus, the corresponding deformation of the bearing ring can only be determined at these discrete sites.

A similar system is described in U.S. Pat. No. 6,920,801, in which an element called a sensor ring surrounds the outer bearing ring of the rolling bearing and has recesses in which three force sensors (which can be optical sensors) are distributed in the peripheral direction, so that both axial and radial forces acting on the sensor can be detected.

European Patent Application EP 1 939 598 A1 shows a rolling bearing in which there are several force sensors distributed in the peripheral direction on the outside ring.

International Patent Application Publication WO 2005/111537 A1 shows a fiber optic sensor which is made as a fiber Bragg grating sensor and which is wound around a body which is attached to a rotating shaft in order to measure its deformation during rotation.

SUMMARY OF THE INVENTION

A primary object of this invention is to devise a method and device for dynamic measurement of at least radial deformation of a rolling bearing ring, in a manner enabling a measurement that is as reliable as possible to be obtained.

This object is achieved by a method for dynamic measurement of the radial deformation of a bearing ring of a rolling bearing for a rotating element, comprising the steps of fixing a glass fiber segment of a fiber optic sensor in or on the periphery of the bearing ring, injecting a light signal which generated by a light source into the glass fiber segment, and detecting the light signal after passing the signal passes through the glass fiber segment with a detector, determining longitudinal deformation of the glass fiber segment from a change of at least one parameter of the detected light signal which has passed through the glass fiber segment, and determining a corresponding radial deformation of the bearing ring from longitudinal deformation determined.

This object is also achieved by a device for dynamic measurement of the radial deformation of a bearing ring of a rolling bearing for a rotating element, comprising a glass fiber segment of a fiber optic sensor which is peripherally fixed in or to the bearing ring, an arrangement for injecting a light signal which has been generated by a light source into the glass fiber segment, a detector for detecting the light signal after the signal has passed through the glass fiber segment, and an evaluation unit for determining the longitudinal deformation of the glass fiber segment from the change of at least one parameter of the light signal which has passed through the glass fiber segment in order to determine the corresponding radial deformation of the bearing ring.

In the approach in accordance with the invention, it is advantageous that, because a fiber optic sensor is peripherally fixed in or on a bearing ring of the rolling bearing, the radial deformation of the bearing ring can be measured not only at some few discrete points which are distributed over the peripheral direction, but almost continuously anywhere, by which the accuracy in detecting the entire radial deformation of the bearing ring, i.e. the ovalness of the bearing ring, can be improved. In particular, in this way measurements can be taken very near in the load region of the bearing. In this connection, the almost continuous local resolution of the measurement is especially advantageous since the pressure point depends on the loading and rpm with which the bearing is operated and is in this respect variable. If conversely discrete sensors as in the prior art are attached only at individual points of the bearing ring, the quality of detection changes when the pressure point or load point is shifted, while a sensor is able to follow the changes of the pressure point.

In addition to determining the radial deformation of the bearing ring from the longitudinal deformation of the sensor, by means of detection of the transverse deformation of the sensor, conclusions can also be drawn about the axial deformation of the bearing ring. The invention can be used, for example, to localize the impact regions of the rolling bodies on the bearing ring, if necessary to detect damaged impact regions in the bearing ring should such exist, to measure vibrations of the rotating bearing ring in a stationary bearing ring, and to detect load states by the deformation of the bearing ring being detected. Furthermore, the invention can be used for detecting microslip in the bearing (with increasing wear, when the bearing seat loosens a little, a certain rotation occurs, whereupon the seat then seizes again; this process is repeated a few times until the bearing finally turns quite freely).

In order to determine the radial deformation or ovalness of the bearing ring with an accuracy that is as high as possible, the measurement results can be compared to a dynamic model of the bearing ring, for example, within the framework of a FEM (finite element method).

Advantageously, the sensor is attached to or in the side of the bearing ring facing away from the rolling bodies, and it can be the inside of the inner bearing ring or the outside of the outer bearing ring and the sensor is attached preferably opposite the support surface of the rolling bodies. Preferably, the sensor is attached in a groove which runs around the bearing ring, for example, by means of a cement connection. In the simplest case, there is a sensor on the stationary bearing ring. However, it is also possible to provide the sensor on the rotating bearing ring, in this case, the detector signal being transmitted wirelessly, for example, telemetrically or by radio, to the evaluation unit.

The sensor can be made, for example, as a fiber Bragg grating (FBG) sensor, spatial resolution in the longitudinal direction of the sensor being achieved by a corresponding variation of the grating period, and to read out the sensor, a frequency division multiplexing method can be used in order to distinguish the different Bragg wavelengths which result due to the variation of the grating period over the length of the sensor.

The rolling bearing can be, for example, the main bearing of a wind power plant.

The invention is explained in detail below by way of example and with referenced to the accompanying drawings.

DETAILED DESCRIPTION OF THE INVENTION

Figure 1:
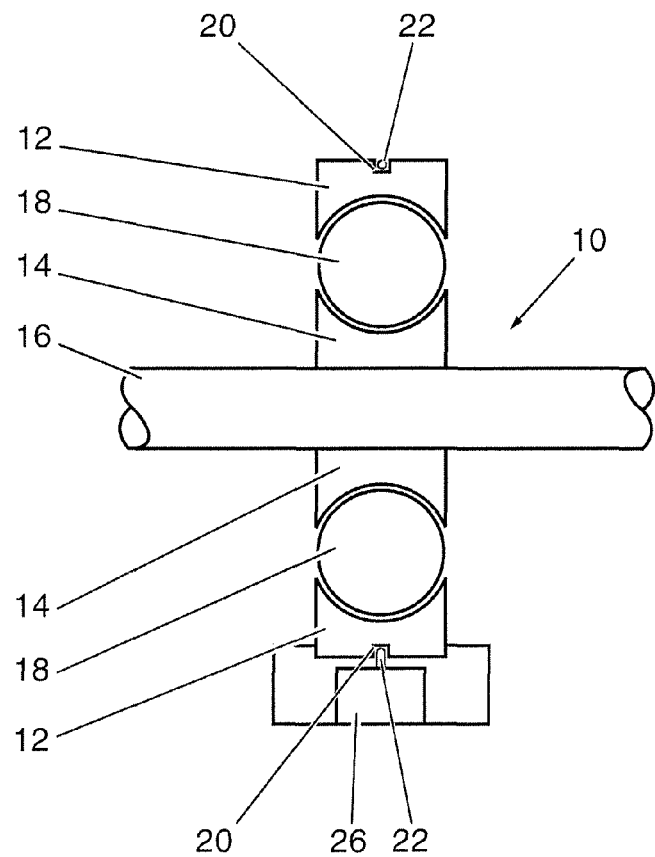
FIG. 1 is a lengthwise section through a rolling bearing with an example of a measurement device in accordance with the invention.
Figure 2:
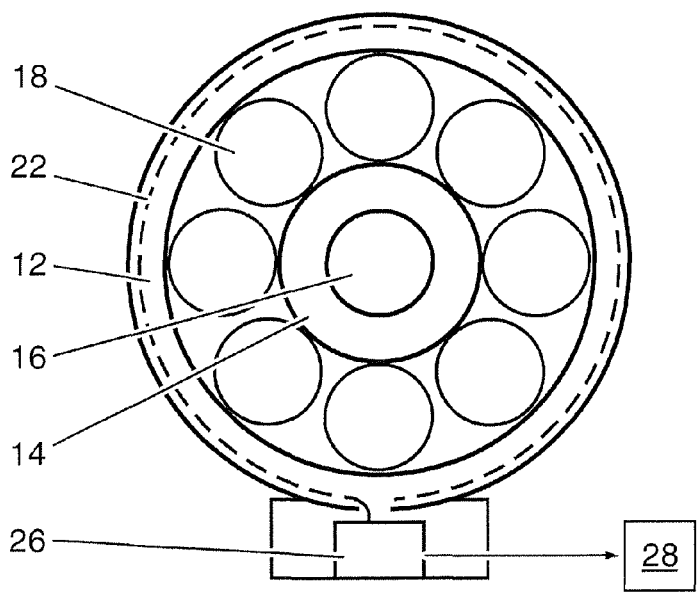
FIG. 2 is a side view of the rolling bearing from FIG. 1 as seen in the axial direction of the bearing.

FIGS. 1 & 2 show a rolling bearing 10 with an outer bearing ring 12 and an inner bearing ring 14 which is attached stationary on the shaft 16. The outer bearing ring 12 is stationary, while the inner bearing ring 14 can be rotated by means of the rolling bodies 18 with respect to the stationary ring 12. On the outside of the outer ring 12, there is a peripheral groove 20 in which a glass fiber segment 22 of the fiber optical sensor 24 is fixed about the periphery of the outer ring, for example, by means of a cement connection. The sensor 24, in addition to the glass fiber segment 22, has a measurement unit 26 which is connected to at least one end of the glass fiber segment 22. The measurement signals which have been determined by the measurement unit 26 are supplied to an evaluation unit 28.

The measurement unit 26 has a light source 30 which is, for example, a laser diode, a beam splitter 32, a detector 34 and lenses 36 in order, on the one hand, to inject a light signal which has been generated by the light source 30 into the glass fiber segment 22, and on the other hand, to detect the light signal after it has passed through the glass fiber segment 22 with the detector 34, the longitudinal deformation, i.e., the expansion or contraction of the glass fiber segment 22, being determined from the change of at least one parameter of the light signal as the light signal passes through the glass fiber segment 22. Since the glass fiber segment 22 is fixed to the bearing ring 12, conclusions regarding the radial deformation of the bearing ring 12 can be drawn therefrom.

In the illustrated example, the light signal which has been reflected in the glass fiber segment 22 is detected by the detector 34. The corresponding measurement signals which are output by the detector 34 are amplified and filtered in a unit 38 and travel via an interface 40 to the evaluation unit 28.

Fundamentally, the evaluated parameters of the light signal could be intensity, phase, wavelength, polarization or pulse transit time.

However, preferably, the fiber optic sensor 24 is a Bragg grating sensor, the glass fiber segment 22 being provided with a plurality of Bragg gratings 44. The Bragg gratings 44 are produced by the core of the glass fiber 42 being illuminated with a spatially varying pattern of intense UV laser light, the photons of this light in part breaking off the silicon-oxygen bonds, by which the structure of the fiber is disrupted and the index of refraction is slightly increased locally. In this way, a periodic variation of the index of refraction of the fibers which corresponds to the pattern is produced. The spatially varying pattern, in turn, can be produced, for example, by the interference of two coherent beams or by means of a suitable mask.

A fiber which has been modified in this way is used as a wavelength-selective mirror: A light signal which has been injected into the fiber is in part reflected at any of the changes of the index of refraction, these reflections at most wavelengths interfering destructively and the light signal propagating essentially undisturbed in the fibers. However, in a narrow wavelength range constructive interference takes place, and the light is reflected in the fibers. The maximum reflectivity occurs, here, at the so-called Bragg wavelength $\lambda_B$ which results from the product of the grating period d, and twice the effective index of refraction.

Figure 4A:
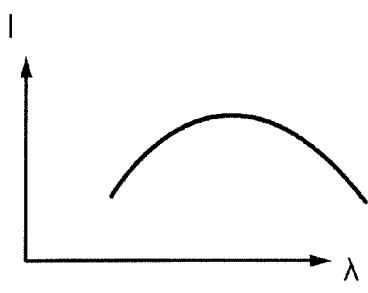
FIG. 4a is a representation of example of the spectral distribution of a light pulse which has been injected into the glass fibers of the sensor.
Figure 4B:
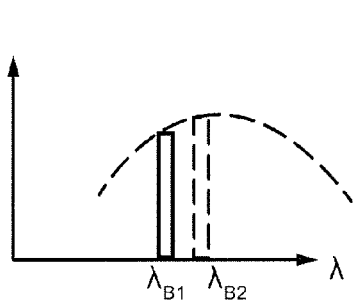
FIG. 4b is a representation of the spectral distribution of a pulse which has been reflected in the glass fibers.

Consequently, a broadband light signal which has been injected into the fibers (see, FIG. 4a) is reflected by the glass fibers as a narrowband signal with essentially the Bragg wavelength $\lambda_{B1}$ (see, FIG. 4b). Since the Bragg wavelength depends on the three-dimensional period of the grating 44 (this in indicated in FIG. 2 with d), expansion or compression of the glass fiber 42 which is caused by the corresponding radial deformation of the bearing ring 12 leads to a corresponding change of the grating period d, by which the Bragg wavelength changes accordingly, for example, to the value $\lambda_{B2}$ (see, FIG. 4b). Therefore, the radial deformation of the bearing ring can be detected by spectral analysis of the reflected light signal.

Simultaneous measurement in different regions along the fiber 42 can take place by the different Bragg gratings 44 being differentiated by their grating period, and thus, their Bragg wavelength, and then, for reading out, a frequency division multiplexing method can be used by the sensor. The expansion or contraction signal is assigned to a certain spatial position in the fibers or on the bearing ring 12 using the respective Bragg wavelength.

Examples of fiber Bragg grating sensors can be found, for example, U.S. Pat. Nos. 4,761,073; 5,426,297 and 6,448,551. Fiber Bragg grating sensors are commercially available from a number of sources, e.g., from Smart Fibres Limited, Bracknell, UK.

Figure 3:
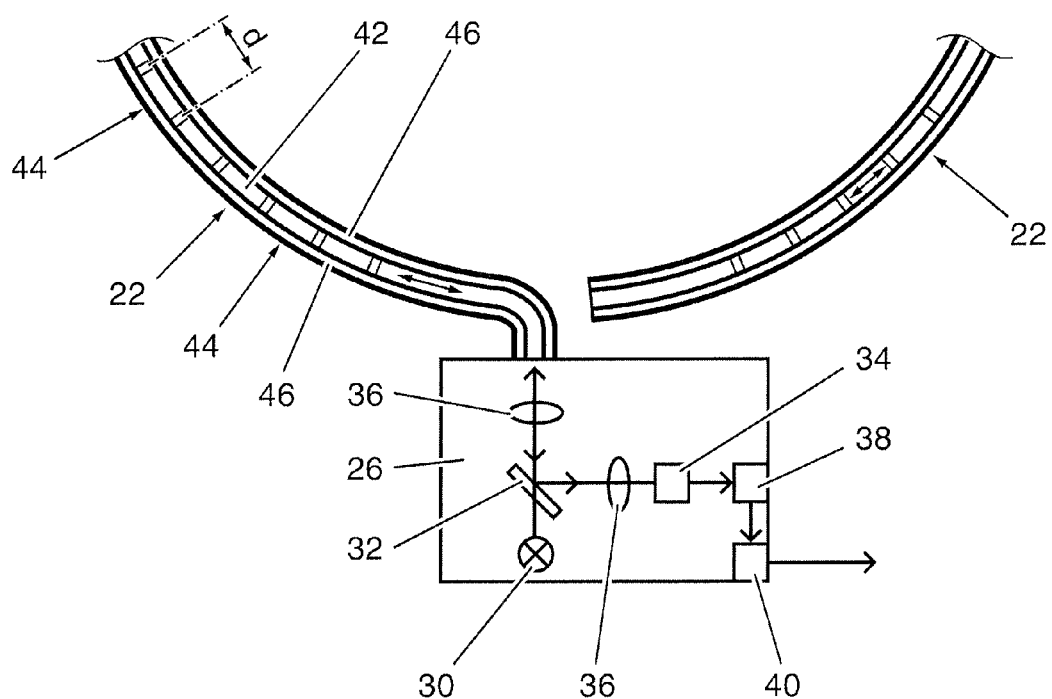
FIG. 3 is an enlarged schematic view of the area of the sensor with the measurement unit for operating the sensor.

In one modified embodiment, instead of measurement of the reflection in fibers 42, as shown in FIG. 3, the transmission through the fibers 42 can be measured by the light emerging on the other end of the fibers 42 being sent to the detector 34 (in this case the light which has been reflected back onto the entry end of the fibers 42 is not routed to the detector 34).

Advantageously, the glass fiber segment 22 is not attached directly to the bearing ring 12 using the fibers 42, but by means of a protective tube 46 which surrounds the fibers 42 and which is made typically of sheet metal.

While FIG. 1 shows only one glass fiber segment 22 running peripherally around the bearing ring 12 once, it is also feasible to have the glass fiber segment 22 run peripherally around the bearing ring 12 several times.

If the sensor 24 is not to measure on the stationary bearing ring 12, but on the rotating bearing ring 14, the measurement unit 30 is modified such that the interface 40 is made as a telemetry unit which transmits the measurement signal wirelessly to the evaluation unit 28.

What is claimed is:

1. Method for dynamic measurement of the radial deformation of a bearing ring of a rolling bearing for a rotating element having inner and outer bearing rings and rolling bodies therebetween, comprising the steps of:
   fixing a glass fiber segment of a fiber optic sensor in or on the periphery of one of the bearing rings with the length of the glass fiber segment extending in a circumferential direction around the periphery of said one of the bearing rings joined to a peripheral surface thereof, injecting a light signal which is generated by a light source into the glass fiber segment, detecting the light signal passing through the glass fiber segment with a detector, determining longitudinal deformation of the glass fiber segment from a change of at least one parameter of the detected light signal passing through the glass fiber segment, and determining a corresponding radial deformation of the bearing ring from the longitudinal deformation determined.

2. Method in accordance with claim 1, wherein the periphery to which the glass fiber segment is attached is an outer periphery facing away from rolling bodies of the rolling bearing.

3. Method in accordance with claim 1, wherein the periphery to which the glass fiber segment is attached is an inner periphery facing toward rolling bodies of the rolling bearing.

4. Method in accordance with claim 2, wherein the glass fiber segment is attached in a circumferentially extending groove formed in the outside of the outer bearing ring.

5. Method in accordance with claim 1, wherein the periphery to which the glass fiber segment is attached is an outer periphery facing away toward rolling bodies of the rolling bearing.

6. Method in accordance claim 5, wherein the glass fiber segment is attached in a circumferentially extending groove formed in the outer surface of the inner bearing ring.

7. Method in accordance with claim 1, wherein the step of determining a corresponding radial deformation of the bearing ring from the longitudinal deformation determined comprises the step of comparing the longitudinal deformation determined to a dynamic model of the bearing ring in order to determine the radial deformation or roundness of the bearing ring.

8. Method in accordance with claim 1, comprising the further step of detecting microslip from the results of the determinations.

9. Method in accordance with claim 1, comprising the further step of determining transverse deformation of the glass fiber segment in order to determine the corresponding axial deformation of the bearing ring.

10. Method in accordance with one claim 1, wherein the glass fiber segment is attached by means of a cement connection.

11. Method in accordance with one claim 1, wherein the bearing ring is stationary.

12. Method in accordance with claim 1, wherein the bearing ring is rotatable and an evaluation unit for performing said determinations is spaced from the bearing ring, detector signals being wirelessly transmitted by a telemetry arrangement to the evaluation unit.

13. Method in accordance with one claim 1, wherein the light signal is reflected in the glass fiber segment before it is detected by the detector.

14. Method in accordance with one claim 1, wherein said at least one parameter is one of light intensity, light phase, light wavelength, light polarization and pulse transit time of the light signal.

15. Method in accordance with claim 1, wherein the fiber optic sensor is a fiber Bragg grating sensor, the glass fiber segment being provided with a plurality of Bragg gratings.

16. Method in accordance with claim 15, wherein a three-dimensional resolution in the longitudinal direction of the glass fiber segment is achieved by variation of the grating period.

17. Method in accordance with claim 16, wherein a frequency division multiplexing reading method is used in order to distinguish the different Bragg wavelengths which result due to the variation of the grating period.

18. Method in accordance with one claim 1, wherein the rolling bearing is a bearing for the drive shaft of a wind power generator which is driven by a propeller.

19. Device for dynamic measurement of the radial deformiation of a bearing ring of a rolling bearing for a rotating element, comprising:

a glass fiber segment of a fiber optic sensor, which segment is fixed in or to the periphery of the bearing ring with the length of the glass fiber segment extending in a circumferential direction around the periphery of said one of the bearing rings joined to a peripheral surface thereof, an arrangement for injecting a light signal which has been generated by a light source into the glass fiber segment, a detector for detecting the light signal passing through the glass fiber segment, and an evaluation unit for determining longitudinal deformation of the glass fiber segment from a change of at least one parameter of the light signal passing through the glass fiber segment and for deteemining a corresponding radial deformation of the bearing ring from the longitudinal deformation determined.

* * * * *